United States Patent [19]

Botkins, Jr.

[11] Patent Number: 4,867,886
[45] Date of Patent: Sep. 19, 1989

[54] METHOD AND APPARATUS FOR CONTROLLING SLUDGE FLOCCULANT FLOW

[75] Inventor: Thomas G. Botkins, Jr., Covington, Va.

[73] Assignee: Westvaco Corporation, New York, N.Y.

[21] Appl. No.: 223,627

[22] Filed: Jul. 25, 1988

[51] Int. Cl.⁴ .............................................. B01D 33/22
[52] U.S. Cl. ..................... 210/709; 210/745; 210/783; 210/86; 210/104; 210/203; 210/330; 210/401; 210/744
[58] Field of Search ............... 210/709, 739, 745, 783, 210/86, 104, 143, 202, 203, 261, 262, 297, 324, 330, 400, 401, 403; 356/381

[56] References Cited

U.S. PATENT DOCUMENTS

| | | | |
|---|---|---|---|
| 578,807 | 3/1897 | Barr et al. | 210/400 |
| 4,053,234 | 10/1977 | McFarlane | 356/381 |
| 4,181,616 | 1/1980 | Bahr | 210/297 |
| 4,341,628 | 7/1982 | Fujinami et al. | 210/407 |
| 4,587,023 | 5/1986 | Srivatsa et al. | 210/783 |
| 4,612,123 | 9/1986 | Eustacchio et al. | 210/407 |
| 4,707,272 | 11/1987 | Kistler | 210/783 |
| 4,824,581 | 4/1989 | Cooper | 210/739 |

FOREIGN PATENT DOCUMENTS

| | | |
|---|---|---|
| 56-2812 | 1/1981 | Japan . |
| 61-7099 | 1/1986 | Japan . |
| 62-179896 | 8/1987 | Japan . |
| 2129326 | 5/1984 | United Kingdom . |

Primary Examiner—Peter Hruskoci
Assistant Examiner—Christopher Upton
Attorney, Agent, or Firm—W. A. Marcontell; R. L. Schmalz

[57] ABSTRACT

The flow of waste water sludge flocculant to a dewatering system is regulated by a surface proximity sensor located downstream of the flocculant addition point. Depth, variability and continuity of a partially drained sludge mat are evaluated by a depth sensor signal processor/analyzer. Signal characteristics representative of an optimally flocculated sludge mat are referenced by the processor/analyzer to establish high and low control set-point values. A variable speed flocculant supply pump or flow control valve is adjusted in response to an operational signal from the depth sensor which exceeds the set-point range.

13 Claims, 4 Drawing Sheets

FIG. 2
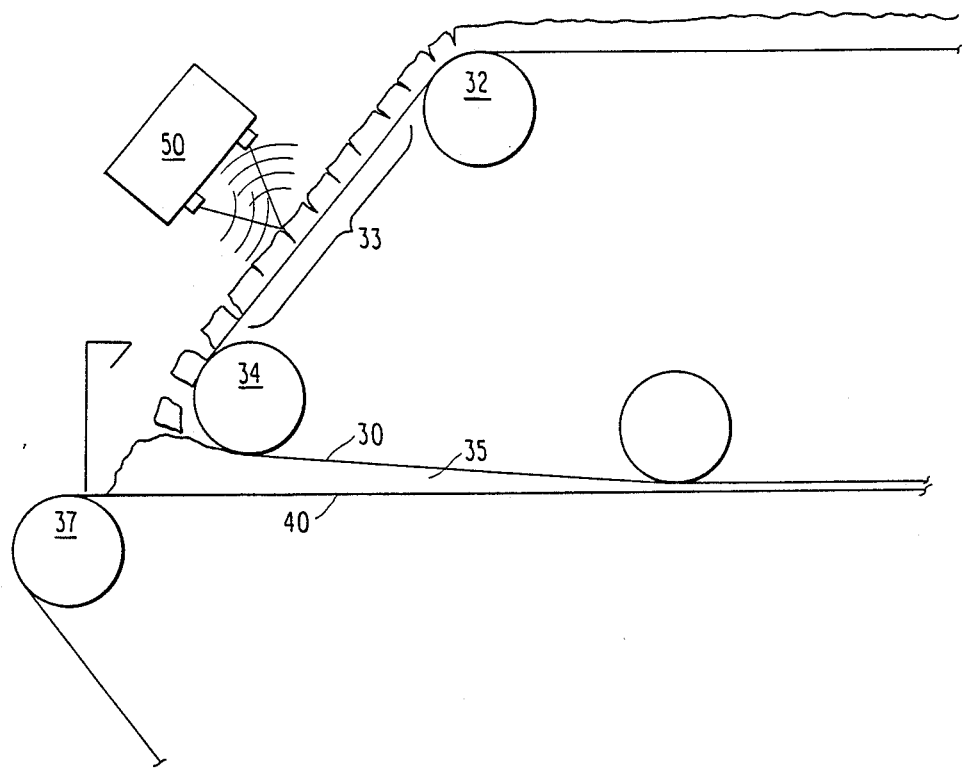
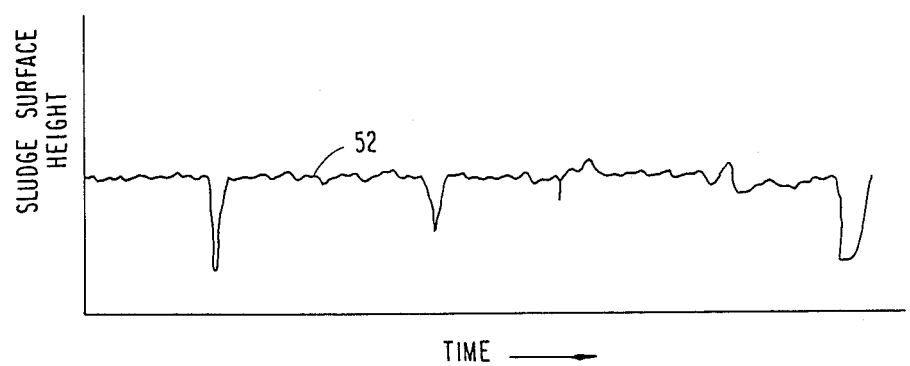
FIG. 3

FIG.6
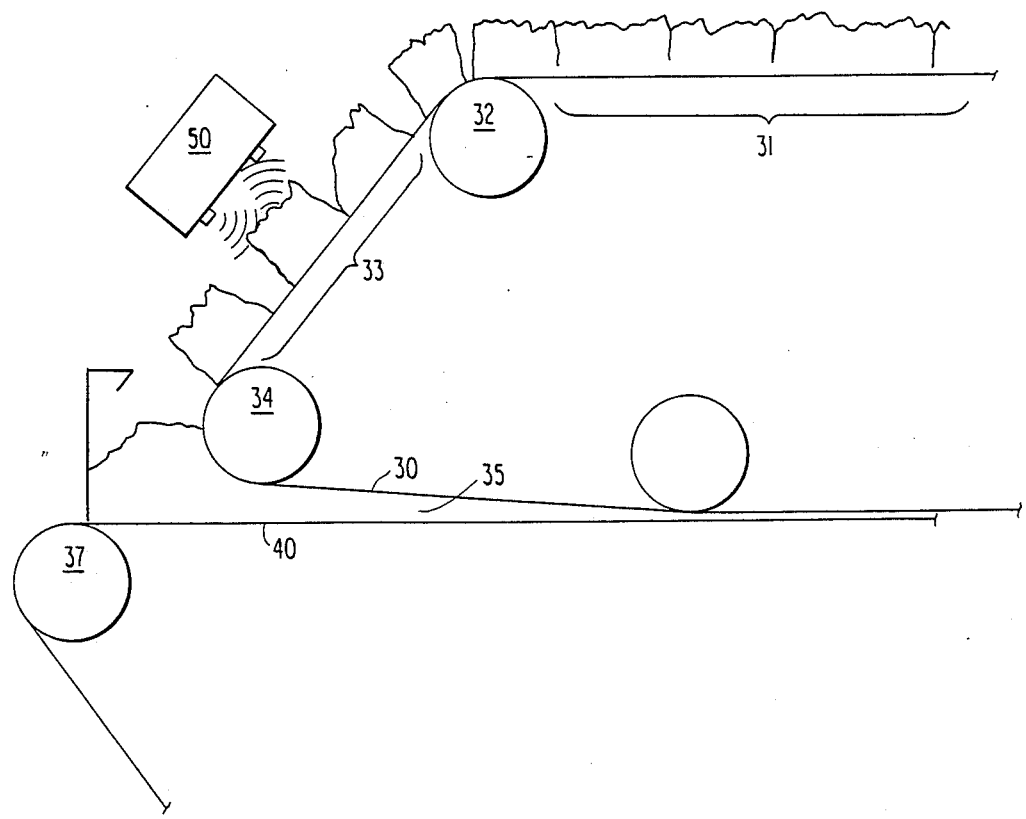
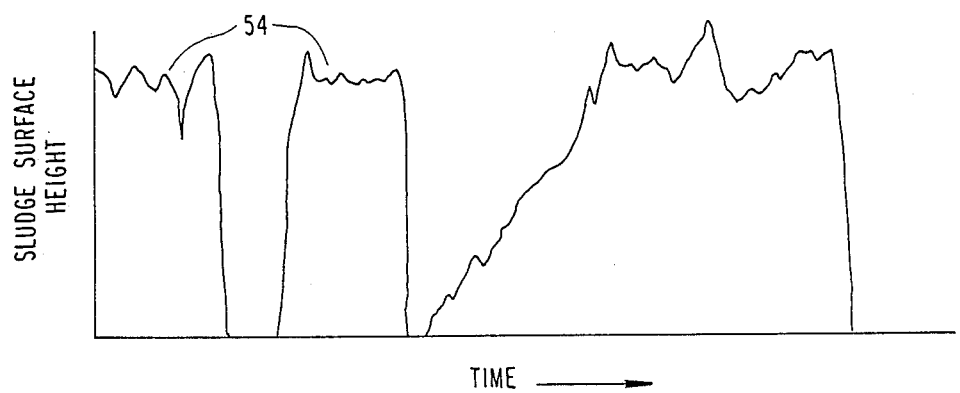
FIG.7

METHOD AND APPARATUS FOR CONTROLLING SLUDGE FLOCCULANT FLOW

BACKGROUND OF THE INVENTION

1. Field of the Invention

The present invention relates to the process step of dewatering aqueously slurried, solid waste treatment sludge. More particularly, the present invention relates to a process and apparatus for monitoring the combination of flocculation chemical with an aqueous sludge influent stream to a dewatering press apparatus.

2. Description of the Prior Art

Aqueous sludge is the product of such diverse processes as municipal and industrial waste treatment, fly ash control and fuel coal preparation. In substance, such sludge comprises an aqueous mixture and suspension of finely divided particulate solids: some of which are hydrated and/or electrostatically charged. In the interest of environmental protection and economic material handling, these particulate solids must be separated from the aqueous vehicle prior to recycle or release. Traditional mechanical screening is inadequate due to the hydrated nature of the solids or the extremely fine particle size. Although a large percentage of the particulates would, in time, dewater gravimetrically, high throughput volume demands on most processing facilities would require exorbitantly large process equipment to implement gravity separation. Accordingly, other means and devices are frequently used to condition the sludge for accelerated dewatering.

One of the more successful sludge conditioning devices is the addition of chemicals which promote particulate dehydration and coagulation. These chemicals are known generically to the industry as flocculants. Common examples of sludge flocculation chemicals include ferric chloride, calcium chloride, sulfuric acid, starch, lime, alum and snythetic polymers of an anionic, cationic or nonionic charge nature. Flocculant is blended with the sludge influent stream to a mechanical screening device such as belt filter press.

By most standards, flocculants are relatively expensive chemicals. Due to the consumption quantity necessary for a large waste water treatment plant, therefore, flocculant may represent the greatest single element of cost to the plant operation. Moreover, the rate of flocculant addition is not a fixed function of the sludge volume throughput. Many factors variable to the sludge constituency continuously alter the flocculant demand. Consequently, continuous operator attention to the screening equipment is required for manual evaluation and adjustment of the flocculant flow rate. Central to the operator's evaluation process is the sludge cake or consistency upon filter press entry. A fluidized sludge at that point denotes insufficient flocculant whereas a stiff and crumbling sludge cake suggests an excess of flocculant, and hence, waste. A factor of 2 may represent the difference between an adequate flocculant flow rate and an excessive flow rate. Because of plant housekeeping chores incident to an inadequate flocculant flow rate, however, operators have a natural tendency to overdose the sludge influent.

It is, therefore, an object of the present invention to provide an automatic method and apparatus for evaluating sludge flocculant flow rate and adjusting the rate correspondingly.

Another object of the invention is to provide a method and apparatus for evaluating the consistency of sludge cake upon belt filter press entry.

Another object of the invention is to provide a sludge cake surface sensor signal analysis method to infer a corresponding cake consistency and flocculant adequacy.

Another invention objective is to provide an abnormal operation monitor to initiate alarms and subsystem shutdowns in the event of certain equipment or sludge supply failures.

SUMMARY OF THE INVENTION

State-of-the-art sludge dewatering equipment comprises an influent mixing zone such as a rotary screen thickner into which raw sludge, mixed with an aqueous solution of dissolved flocculant, is pumped for screened water separation. From the rotary screen thickner, residual sludge mixture is discharged into a sludge headbox which distributes it onto an upper side of a first traveling belt screen. As the first belt screen passes over an open gravity dewatering zone, free water in the sludge mixture flows by gravity through the screen mesh. Coagulated particulates retained on the first belt surface along the gravity dewatering zone are deposited at the end thereof onto a second belt screen. The upper side of the second belt screen cooperates with the under side of the first belt to entrap the sludge particulates top and bottom in a wedge zone which squeezes additional water from the cake consistency of remaining sludge. The sandwich combination of the first and second belts, with sludge cake in between, is thereafter converged along a serpentine course between several more roll nips which form a third, high pressure squeezing zone. At the end of the high pressure zone, the two belts are separated over respective turning rolls to release and discharge the dewatered cake.

According to the present invention, the cake near the end of the first belt is monitored by a non-contacting, cake surface reporting sensor such as a sonic or laser proximity instrument. Depending on the combined amplitude and continuity characteristics of the sludge surface sensor signal, a programmed judgment is made whether more, less or no change is to be made in the flocculant flow rate. A corresponding control signal from a sensor signal evaluation computer adjusts an appropriate flocculant flow rate control means such as a pump or valve.

BRIEF DESCRIPTION OF THE DRAWINGS

Relative to the drawings wherein like reference characters designate like or similar elements throughout the several figures of the drawings:

FIG. 2 is a process schematic illustrating a sludge mat within a belt screen transfer zone that has been correctly dosed with flocculation chemical.

FIG. 3 illustrates the signal trace of a surface proximity sensor response to the sludge mat of FIG. 2.

FIG. 6 is a process schematic illustrating a sludge mat within a belt screen transfer zone that has been excessively dosed with flocculation chemical.

FIG. 7 illustrates the signal trace of a surface proximity senor response to the sludge mat of FIG. 6.

DESCRIPTION OF THE PREFERRED EMBODIMENT

As received from a solid waste treatment plant or other source, sludge is a pumpable fluid of about 1 to 10 percent solids consistency. The fluid includes both dissolved and hydrated solids. Frequently, it has already been the subject of a mechanical filtration step.

Figure 1:
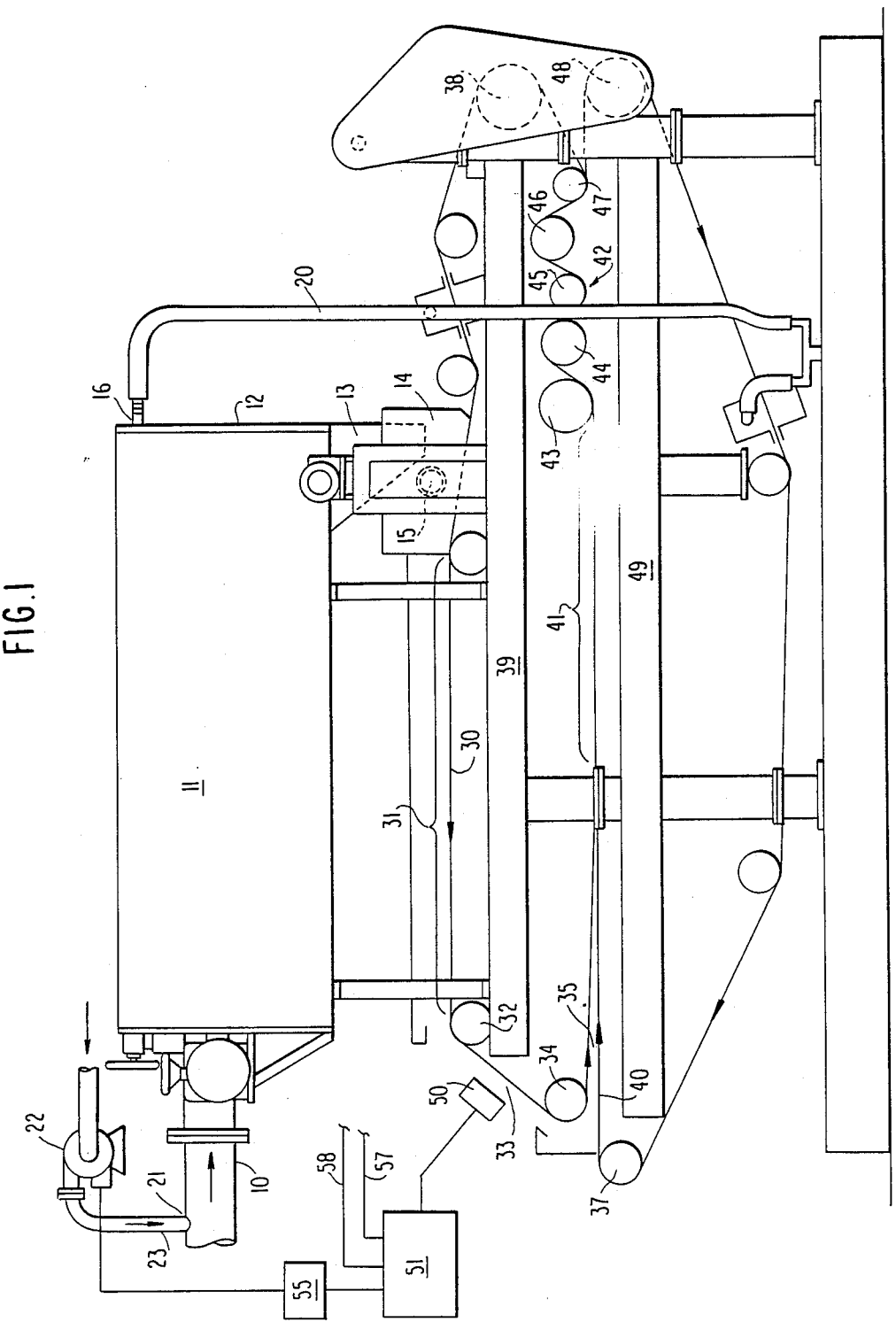
FIG. 1 is a schematic representation of a sludge dewatering apparatus having the present invention incorporated therein.

To reduce such sludge further to a 30 percent or greater consistency, an influent fluid flow stream 10 of 1-10 percent sludge as shown in the upper left corner of FIG. 1 is mixed with an aqueous solution of flocculant chemical at a mixing juncture 21. A variable speed pump 22 or automatic control valve regulates the flocculant flow rate within the flocculant supply pipe 23. The resulting mixture is thereafter routed into a rotary screen filter 11. Such apparatus normally comprises a cylindrical screen of fine mesh mounted for driven rotation about the cylinder axis. A helical baffle within the cylinder advances the sludge flow by rotation along the axis to the discharge end 12 as a large portion of free water in the sludge mixture constituency passes through the screen openings. A funnel 13 channels the screened residual into a distribution headbox 14. A rotary spreader screw 15 within the headbox distributes the residual sludge evenly across the width of a first belt screen 30.

A screen cleaning spray 16 located within the external shell of the rotary screen filter unit 11 showers recycled water against the rotating cylinder screen for the purpose of maintaining the screen openings. A recycled water supply pipe 20 serves the cleaning spray 16.

Upon emergence from the headbox 14, first belt screen 30 carries the sludge across a gravity drainage zone 31 wherein another large percentage of water in the residual mixture passes through the belt screen pores to leave a layer of consolidated solids matted on the upper belt surface.

At the end of the gravity drainage zone 31, the first belt 30 turns sharply over a roll 32 into an inclined transfer zone 33. Turning roll 34 terminates the transfer zone and directs the course of belt 30 along a converging wedge zone 35.

Partially dewatered sludge descending the transfer zone 33 falls upon a second belt screen 40 to be carried thereby into wedge zone convergence with the second belt 40 which supports the mat from below while the first belt 30 confines the belt from above. Upon convergence, the two belts follow a common course along a zone 41 of increasing pressure wherein additional water is squeezed from the sludge mat while held in confined lamination between the belts. As a final expression force, the belt sandwich is coursed along a serpentine wrap zone 42 over a series of turning rolls 43-47. From the final roll 47, the two belts are separated and coursed over respective driven breast rolls 38 and 48.

Drainage trays 39 and 49 capture the expressed water to be recycled or treated. The substantially dry (30+%) solids) sludge mat falls from the second belt 40 as it turns about the breast roll 48 to be further processed or disposed of in a manner consistent with the primary process.

In operation, prior art flow control over the flocculant addition rate has been manual. An operator observes the sludge consistency as it descends the incline of the transfer zone 33. If the flocculant additive rate is correct, the sludge cake should be beginning to form as the transfer zone is approached. While there is some cracking of the cake continuity as it turns over the roll 32, little separation of the cake body occurs as it descends the transfer zone incline. This condition is illustrated by FIG. 2.

Figure 4:
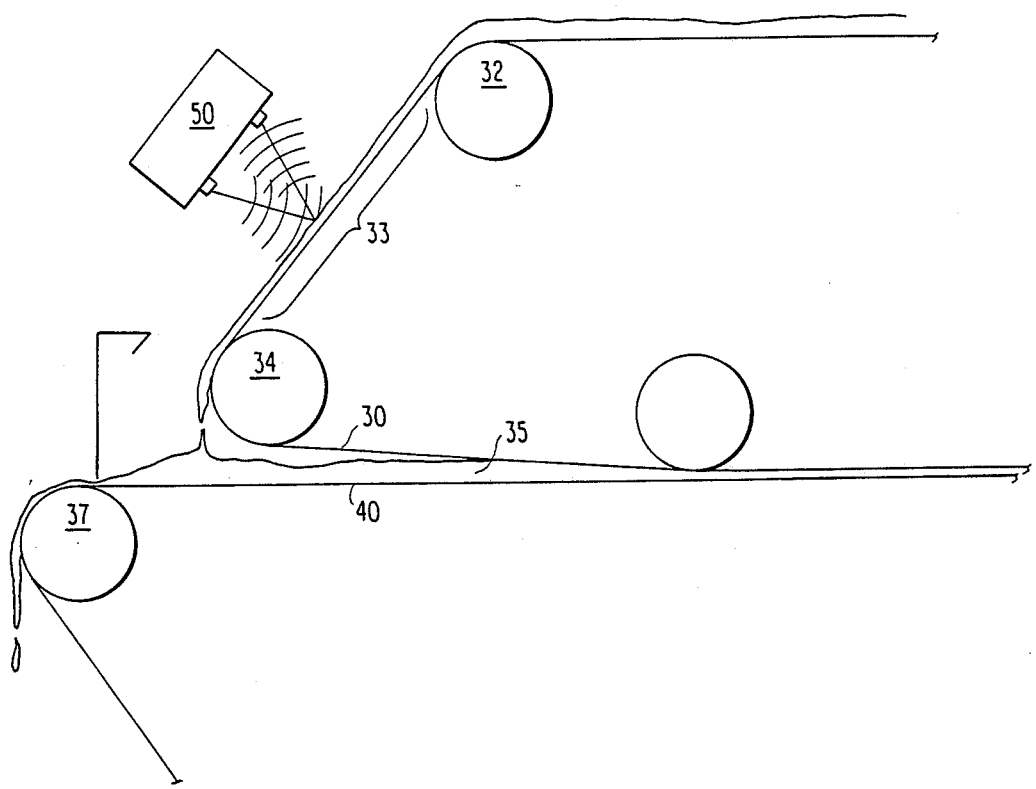
FIG. 4 is a process schematic illustrating a sludge mat within a belt screen transfer zone that has been insufficiently dosed with flocculation chemical.

When a flocculant flow rate is too low for the sludge flow rate or consistency, the sludge mat will remain fluid and unformed along the transfer zone. Mat depth will be relatively low and continuous as illustrated by FIG. 4. A severe flocculant deficiency will permit the suspended sludge solids to cascade down the transfer zone incline, against the travel direction of the lower belt and over the turning roll 37. Simultaneously, suspended solids are passing through the screen pores into effluent pans 39 and 49.

FIG. 6 illustrates an extreme excess of flocculant addition rate. In this case, the cake is deep and fully formed by the end of the gravity drainage zone. Separation of the cake continuity occurs as it passes over the turning roll 32. Discrete particles of cake will tumble down the transfer zone incline.

When the flocculant addition rate is too low, excess quantities of solid are lost to the drain or tertiary treatment system. An excessive flocculant addition rate captures no additional solid and therefore wastes the flocculant chemical.

Pursuant to the present invention, flocculant addition is regulated as a function of cake surface characteristics developed by the time the cake reaches the transfer zone 33. Positioned above the transfer zone is a surface proximity sensor 50 such as a sonar or laser emitter-detector. This instrument generates an electrical signal analog responsive to the proximity of a small area increment of the mat or cake surface descending the belt transfer zone 33. Depending on the process objective and the width of belts 30 and 40, the sensor unit 50 may be a single, fixed position unit, a multiplicity of single units or a single unit mounted for reciprocal scanning across the belt width.

Figure 5:
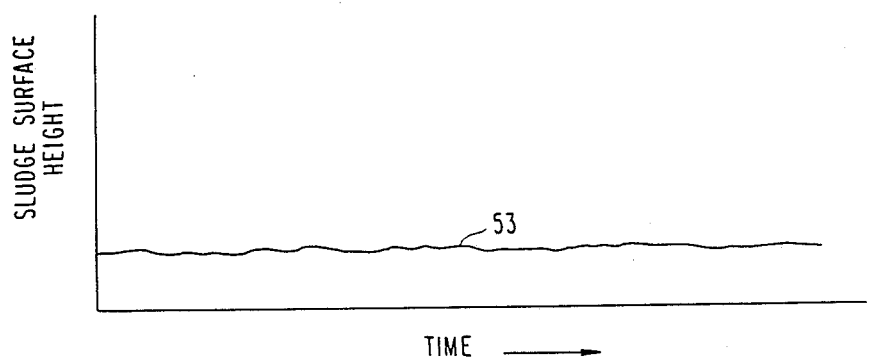
FIG. 5 illustrates the signal trace of a surface proximity sensor responsive to the sludge mat of FIG. 4.

Signals emitted by the sensor 50 are received by a signal processor and analyzer 51. Here, the sensor 50 surface proximity signals are evaluated as a continuum to determine the average mat or cake depth and the variability of that depth The significance of those factors is seen from a comparison of the signal traces 52, 53 and 54 respective to FIGS. 3, 5 and 7. Signal trace 52 of FIG. 3 corresponds to the optimally flocculated sludge cake shown by FIG. 2. Signal trace 53 of FIG. 5 corresponds to the insufficiently flocculated sludge mat of FIG. 4 and signal trace 54 relates to the excessively flocculated cake of FIG. 6.

As stated previously, the cake characteristics of FIG. 2 are representative of optimum flocculation. Consequently, the average amplitude and variability of signal 52 provide reference values from which high and low set-point values may be determined Such set-point values are used to quantify the differential characteristics of signals 53 and 54. For example, signal 53 which represents the under-flocculated sludge condition of FIG. 4, has, relative to signal 52, a low amplitude and variability. The under-flocculated sludge mat along the transfer zone 33 is a substantially continuous liquid stream having a uniform surface texture and shallow depth. Responsively, signal trace 53 is substantially continuous, has little variability and a low amplitude. On this basis, the signal amplitude and variability would fall below established set-point norms to switch a flow control system 55 to a flocculant flow increase mode. Such an increase mode may command a certain degree of flocculant pump 22 speed increase or valve set opening and stop: awaiting elapse of a predetermined time period before taking any further response action to control commands of the signal processor and analyzer 51.

Applying a similar analysis to the signal 54 of FIG. 7, we see that the signal mirrors the FIG. 6 mat surface passing sensor 50. Amplitude is high but also highly variable and discontinuous. Excessive flocculation set-point norms set by the processor/analyzer 50 are exceeded to initiate a flow decrease mode from the flow controller 55. Flocculant pump 22 speed is reduced by a predetermined degree and the system stops to await a response.

In addition to flocculation chemical flow rate control, mat depth and variability signals from sensor 50 have independent utility for monitoring other functions of a sludge dewatering plant. For example, a constant signal of normal to high amplitude and no variability would indicate a stationary reflection area of the mat. This circumstance would occur when the belt screens 30 and 40 have stopped: perhaps due to failure of the common drive motor. Responsively, signal processor and analyzer 51 would issue signal 57 to stop the flow of influent sludge through pipe 10 and flocculant chemical through pipe 23. Such a response protects the plant from the consequences of sludge inundation.

Of course, the same signal 57 may also be used to condition other subsystems in the plant for a shutdown status.

As another representative utility for the mat depth and continuity signals of sensor 50, an essentially constant signal of extremely low amplitude and no variability may indicate an interrupted supply of sludge from either the influent flow stream 10 or from the rotary screen filter 10. In either case, no sludge is being deposited on the belt 30 and the sensor 50 is reading only the belt 40 bare surface. Assuming these conditions to be an operational anomoly, responsive signal 58 from the signal processor and analyzer 51 may be used to initiate alarms or condition other appropriate subsystems.

Although other sensor and signal analysis systems may be devised to automatically correlate the sludge mat surface characteristics to the relative amount of flocculant dosage, as my invention.

I claim:

1. An apparatus for controlling the flow rate of flocculant chemical into an aqueous sludge flow stream influent to a sludge dewatering means, said apparatus comprising; sludge conduit means for delivering an influent flow stream of aqueous sludge to a continuous mixing means, effluent from said mixing means being deposited on sludge dewatering means, flocculant conduit means for delivering flocculant chemical into combination with said sludge and said mixing means, said flocculant conduit means including flocculant flow rate control means. said dewatering means having a traveling screen to carry such sludge from a gravity drainage zone through a high pressure expression zone, sensor means to measure the depth and variability of surface characteristics of a sludge mat residual retained on said traveling screen while in transition from said gravity drainage zone and in transit to said high pressure expression zone and transmit a signal proportional thereto, signal processing means responsive to said sensor means to receive said signal for comparison to high and low signal characteristic set-points corresponding to depth and consistency of said sludge; and means responsive to said signal processing means for transmitting operating signals to said flocculant flow rate control means.

2. An apparatus as described by claim 1 wherein said sensor means is a sonar distance measuring instrument.

3. An apparatus as described by claim 1 wherein said sensor means is a laser distance measuring instrument.

4. An apparatus as described by claim 1 wherein said mixing means comprises a rotary screen filter for receiving said sludge as a pumpable fluid and wherein said flocculant is distributed throughout the mass of said sludge.

5. An apparatus as described by claim 4 comprising means for discharging said flocculant distributed sludge from said rotary screen filter into sludge distributing headbox means for metered deposition onto said traveling screen.

6. An apparatus as described by claim 5 wherein said gravity drainage zone extends from said headbox to an inclined transfer zone wherein said mat residual of said sludge is transferred from the top surface of a first traveling belt to the top surface of a second traveling belt.

7. An apparatus as described by claim 6 wherein sensor means is positioned to monitor the surface of said mat residual on said first traveling belt within said transfer zone.

8. A method of controlling the flow rate of flocculant chemical into the aqueous sludge influent of a sludge dewatering means, said method comprising the steps of:
remotely sensing the depth and variability of surface characteristics of a sludge residual mat carried on a continuous dewatering screen surface within said dewatering means while in transition from a gravity drainage zone of said dewatering means and in transit to a high pressure expression means;
generating first electrical signals corresponding to said residual mat depth and variability of surface characteristics;
analyzing said first signal for deviation from a value range corresponding to depth and consistency characteristics of said sludge indicative of an acceptable flocculant flow rate of mixture with said sludge influent; and,
generating a second signal responsive to said analysis for operating flocculant flow control means in a deviation corrective direction.

9. A method as described by claim 8 wherein the depth and variability of surface characteristics of said sludge residual mat is sensed by sonically measuring the distance to the surface of said mat from a reference position, said first signals corresponding to said measurements.

10. A method as described by claim 8 wherein said first signals are analyzed for amplitude and variability.

11. A method as described by claim 8 wherein the depth and variability of surface characteristics of said sludge residual mat is sensed by optically measuring the distance to the surface of said mat from a reference position, said first signals corresponding to said measurement.

12. An apparatus for monitoring the operation of an aqueous sludge dewatering means comprising an endless belt screen for carrying a continuous supply of sludge combined with flocculant chemical over a gravity dewatering zone wherein the solids consistency of said sludge is increased by the filtration of aqueous vehicle through said screen, flocculant chemical flow rate control means for regulating the rate said chemical is combined with said sludge, sensor means to measure the depth and variability of surface characteristics of sludge mat residual retained on said belt screen while in transition from said gravity dewatering zone and in transit to a high pressure expression zone and signal processing means responsive to sensor signals from said sensor means for comparison to high and low signal characteristic set-points corresponding to depth and consistency of said sludge; and issuing a corresponding abnormal operation signal to said flow rate control means.

13. A method of monitoring the operation of an aqueous sludge dewatering process wherein a substantially continuous flow of such sludge is filtered on a screen belt traveling about a closed circuit, said method comprising the steps of:

without physical contact with the surface or substance of, filtered sludge residual remaining on said belt while in transition from a filtrate drainage increment and in transit to a high pressure expression means of said traveling belt circuit, measuring the depth of said sludge residual;

generating an electric signal continuum proportional to said sludge residual depth and to variability of surface characteristics of said sludge residual, corresponding to consistency of said sludge;

establishing depth and variability of surface characteristics set-points for said signal continuum;

comparing said signal continuum to said set-points; and, generating process equipment control signals responsive to said set-point comparison for operating a means to control a flow rate of flocculant chemical into said aqueous sludge.

* * * * *